United States Patent
Joo

(10) Patent No.: US 8,848,967 B2
(45) Date of Patent: Sep. 30, 2014

(54) MOBILE TERMINAL

(71) Applicant: LG Electronics Inc., Seoul (KR)

(72) Inventor: Wonseok Joo, Seoul (KR)

(73) Assignee: LG Electronics Inc., Seoul (KR)

( * ) Notice: Subject to any disclaimer, the term of this patent is extended or adjusted under 35 U.S.C. 154(b) by 18 days.

(21) Appl. No.: 13/710,021

(22) Filed: Dec. 10, 2012

(65) Prior Publication Data

US 2013/0156233 A1    Jun. 20, 2013

(30) Foreign Application Priority Data

Dec. 20, 2011    (KR) .................. 10-2011-0138538

(51) Int. Cl.
*H04R 25/00*    (2006.01)

(52) U.S. Cl.
USPC ..................... 381/388; 381/151; 381/333

(58) Field of Classification Search
USPC ......... 381/306, 333–334, 151–152, 162, 386, 381/388, 392
See application file for complete search history.

(56) References Cited

U.S. PATENT DOCUMENTS

| 7,050,600 B2 * | 5/2006 | Saiki et al. ................. 381/388 |
| 7,548,766 B2 * | 6/2009 | Takahata et al. ............. 381/388 |
| 7,657,042 B2 * | 2/2010 | Miyata ...................... 381/388 |
| 7,764,803 B2 * | 7/2010 | Kang ........................ 381/388 |

FOREIGN PATENT DOCUMENTS

| EP | 1 542 064 A1 | 6/2005 |
| EP | 1 970 792 A2 | 9/2008 |
| KR | 10-1068254 B1 | 9/2011 |
| WO | WO 2010/038370 A1 | 4/2010 |

* cited by examiner

*Primary Examiner* — Suhan Ni
(74) *Attorney, Agent, or Firm* — Birch, Stewart, Kolasch & Birch, LLP

(57) ABSTRACT

A mobile terminal includes a body having a front surface and a rear surface; a display unit formed on the front surface of the body; a frame disposed between the front surface and the rear surface, and configured to support the display unit; and a sound output device configured to transmit sound using bone conduction vibrations, and connected to the frame so as to transmit the vibration to the display unit.

19 Claims, 12 Drawing Sheets

MOBILE TERMINAL

CROSS-REFERENCE TO RELATED APPLICATION

Pursuant to 35 U.S.C. §119(a), this application claims the benefit of earlier filing date and right of priority to Korean Application No. 10-2011-0138538, filed in Republic of Korea on Dec. 20, 2011, the contents of which is incorporated by reference herein in its entirety.

BACKGROUND OF THE INVENTION

1. Field of the Invention

The present disclosure relates to a mobile terminal, and particularly, to a mobile terminal having a bone conduction sound output device.

2. Background of the Invention

In general, a terminal may be classified into a mobile (portable) terminal and a stationary terminal according to a moveable state. The mobile terminal may be also classified into a handheld terminal and a vehicle mount terminal according to a user's carriage method.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Various attempts have been made to implement complicated functions in such a multimedia device by means of hardware or software.

As one of structural improvements of the mobile terminal, a bone conduction sound output device may be applied to the mobile terminal. However, there has been disclosed no structure for effectively applying a bone conduction sound output device to the mobile terminal.

SUMMARY OF THE INVENTION

Therefore, an aspect of the detailed description is to provide a mobile terminal capable of implementing a large screen by having no sound discharge opening on a front surface thereof.

Another aspect of the detailed description is to provide a mobile terminal including a bone conduction sound output device having an enhanced mounting characteristic or performance.

To achieve these and other advantages and in accordance with the purpose of this specification, as embodied and broadly described herein, there is provided a mobile terminal, comprising: a body having a front surface and a rear surface; a display unit formed on the front surface of the body; a frame disposed between the front surface and the rear surface, and configured to support the display unit; and a sound output device configured to transmit sound using bone conduction vibrations, and connected to the frame so as to transmit the vibration to the display unit.

The display unit may include a window disposed on the front surface of the body; and a display accommodated in the frame so as to face the window, and overlapping the sound output device in a thickness direction of the body.

The frame may have an accommodation portion for accommodating the display unit, and the sound output device may be mounted on an opposite surface to the bottom of the accommodation portion. A mounting surface having a stair-step from the bottom of the accommodation portion may be formed at the frame such that the window is mounted to cover the display unit.

According to another embodiment of the present invention, the sound output device may be attached to the frame by using a double-sided tape. A rib configured to limit a movement of the sound output device may protrude from the frame. An air gap may be formed between the rib and the sound output device.

Assembly wings may protrude from an outer circumferential surface of the sound output device such that the sound output device is screw-coupled to the frame by the assembly wings as well as by the double-sided tape.

According to another embodiment of the present invention, the frame may include a base portion which forms at least part of the frame; a mounting portion is spaced from the base portion, and configured to mount the sound output device thereon; and bridge portions configured to connect the base portion and the mounting portion to each other.

The bridge portions may protrude from the base portion toward a rear surface of the body. An electronic device may be mounted to the frame, and a space may be formed between the mounting portion and the electronic device by the protrusion of the bridge portions.

The bridge portions may be disposed on the outer circumference of the mounting portion at preset intervals. Vibrations of the sound output device may be transmitted to the base portion along the bridge portions.

According to still another embodiment of the present invention, the frame may include through ho les or slits formed at preset intervals along the outer circumference of the sound output device.

According to still another embodiment of the present invention, the frame may include a first frame and a second frame, and the sound output device may be mounted to the first frame and may be covered by the second frame. And, a first damping pad may be mounted between the second frame and the sound output device.

A discharge hole through which peripheral air of the sound output device may be formed at the second frame. A battery may be mounted in the body, and a battery cover for covering the battery may be detachably coupled to the second frame. A second damping pad configured to damp vibrations of the sound output device may be disposed between the second frame and the battery cover.

According to still another embodiment of the present invention, the sound output device may be connected to the frame via a printed circuit board or the display unit.

According to still another embodiment of the present invention, the sound output device may be electrically connected to a printed circuit board, and a cut-out portion where the sound output device is disposed may be formed on one edge of the printed circuit board. A camera may be disposed at the cut-out portion together with the sound output device.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal according to the present disclosure will be explained in more detail with reference to the attached drawings. The suffixes attached to components of the wireless speaker, such as 'module' and 'unit or portion' were used for facilitation of the detailed description of the present disclosure. Therefore, the suffixes do not have different meanings from each other.

The mobile terminal according to the present disclosure may include a portable phone, a smart phone, a laptop computer, a tablet computer, a digital broadcasting terminal, Personal Digital Assistants (PDA), Portable Multimedia Player (PMP), a navigation system, etc. However, it will be obvious to those skilled in the art that the present disclosure may be also applicable to a fixed terminal such as a digital TV and a desktop computer.

Figure 1:
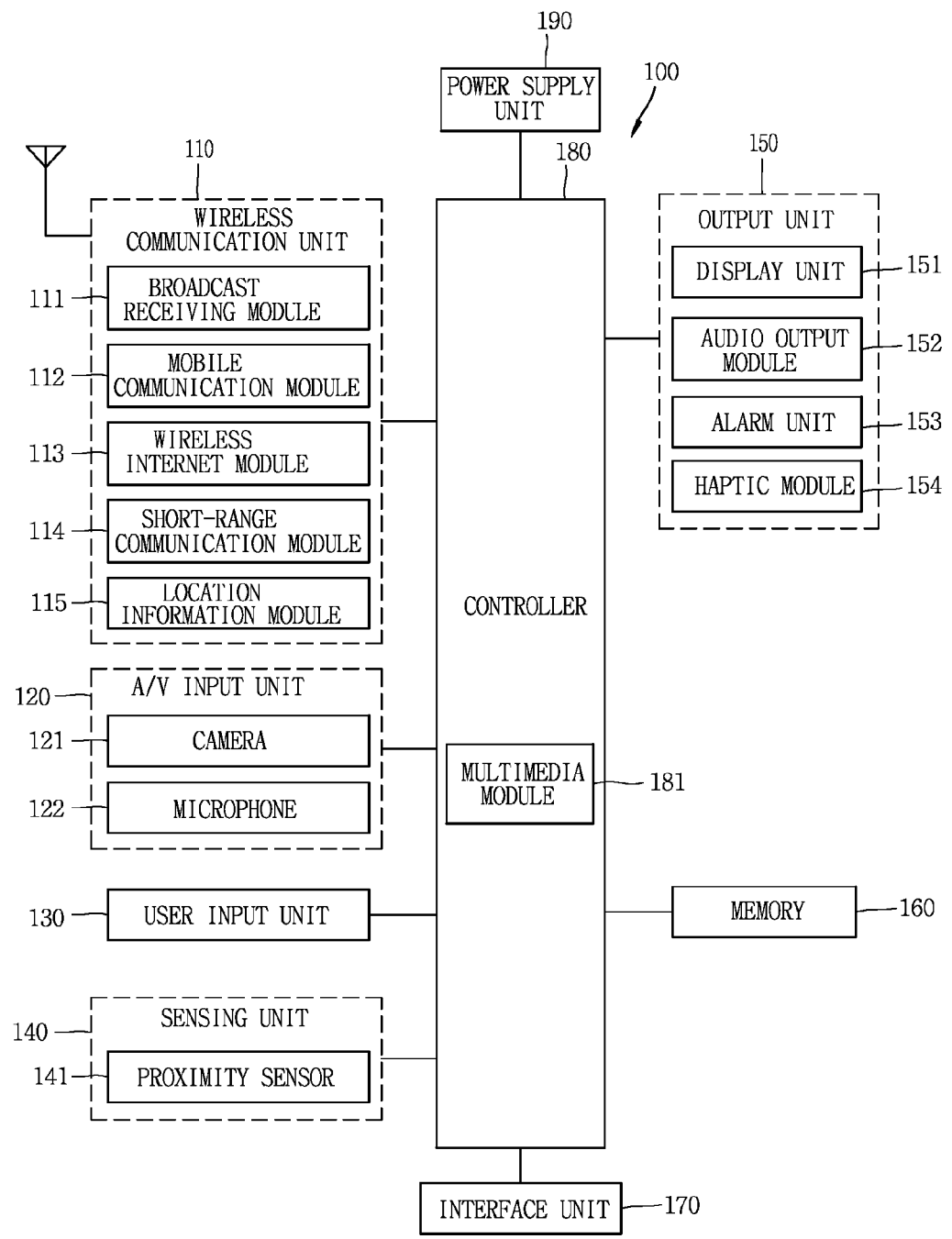
FIG. 1 is a block diagram of a mobile terminal according to one embodiment of the present invention.

FIG. 1 is a block diagram of a mobile terminal according to one embodiment of the present disclosure.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply unit 190, and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcasting signals and/or broadcasting associated information received through the broadcast receiving module 111 may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for sensing or calculating a position of a mobile terminal. An example of the position information module 115 may include a Global Position System (GPS) module.

Referring to FIG. 1, the A/V input unit 120 is configured to receive an audio or video signal. The A/V input unit 120 may include a camera 121, a microphone 122 or the like. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. The camera 121 may be provided in two or more according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is open or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner. The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of these displays may be configured to be transparent so that outside may be seen therethrough, which may be referred to as a transparent display. A representative example of the transparent display may include a Transparent Organic Light Emitting Diode (TOLED), and the like. The rear surface portion of the display unit 151 may also be implemented to be optically transparent. Under this configuration, a user can view an object positioned at a rear side of a body through a region occupied by the display unit 151 of the body.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch to sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the mobile terminal blocked by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, and so on.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. The video signal or the audio signal may be output via the display unit 151 or the audio output module 152. Accordingly, the display unit 151 or the audio output module 152 may be classified as a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not is only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of is the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2A:
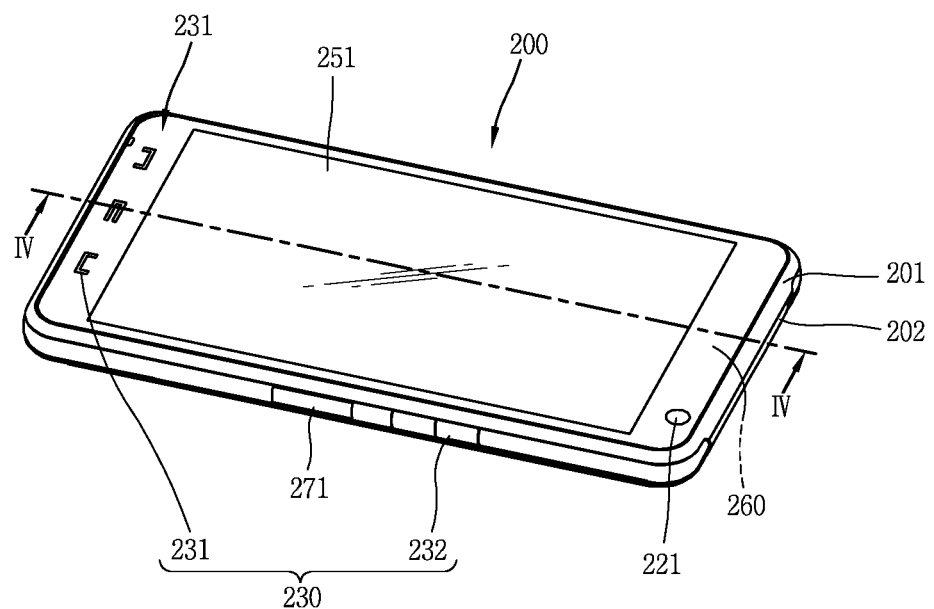
FIG. 2A is a front perspective view of a mobile terminal according to the present invention.
Figure 2B:
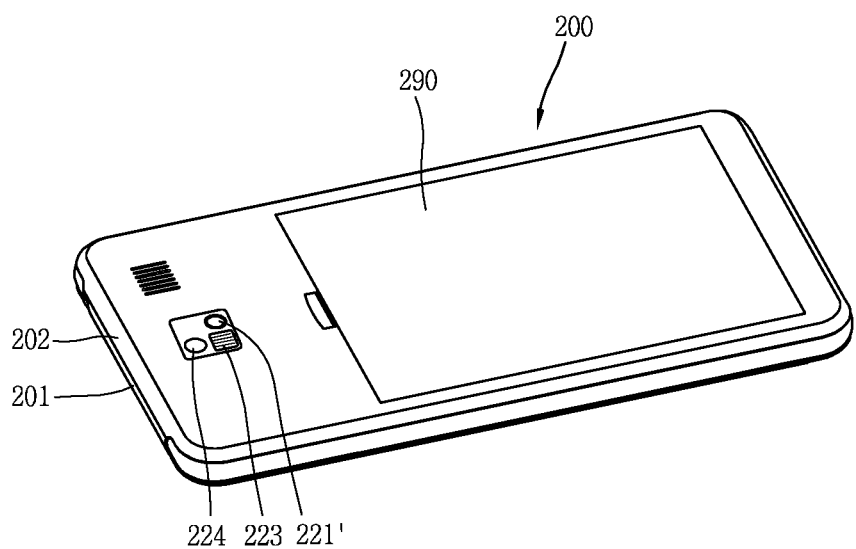
FIG. 2B is a rear perspective view of the mobile terminal of FIG. 2A.

FIG. 2A is a front perspective view of the mobile terminal according to one embodiment of the present invention, and FIG. 2B is a rear perspective view of the mobile terminal according to one embodiment of the present invention.

The mobile terminal 200 according to the present disclosure is a bar type mobile terminal. However, the present disclosure is not limited to this, but may be applied to a slide type in which two or more bodies are coupled to each other so as to perform a relative motion, a folder type, or a swing type, a swivel type and the like.

A case (casing, housing, cover, etc.) forming an outer appearance of a body may include a front case 201 and a rear case 202. A space formed by the front case 201 and the rear case 202 may accommodate various components therein. At least one intermediate case may further be disposed between the front case 201 and the rear case 202.

Such cases may be formed by injection-molded synthetic resin, or may be formed using a metallic material such as stainless steel (STS) or titanium (Ti).

At the front case 201, may be disposed a display unit 251, an audio output unit 260, a camera 221, user input units 231, 232 and 233, etc.

The display unit 251 occupies most parts of a main surface of the front case 201. The audio output unit 260 and the camera 221 are arranged at a region adjacent to one end of the display unit 251.

Various types of visual information may be displayed on the display unit 251. The information may be displayed in the form of texts, numbers, symbols, graphics, or icons.

For input of such information, at least one of the texts, numbers, symbols, graphics and the icons are displayed in the form of a keypad. Such keypad may be called soft keys.

The display unit 251 may operate entirely, or in a divided manner into a plurality of regions. In the latter case, the plurality regions may be configured to operate in an associated manner with each other.

The user input unit 230 is manipulated to receive a command for controlling the operation of the mobile terminal 200, and may include a plurality of manipulation units 231, 232 and 233. The manipulation units 231, 232 and 233 may be referred to as manipulating portions, and may include any type of ones that can be manipulated in a user's tactile manner.

Commands inputted through the first to third user input units 232, 232 and 233 may be variously set. For instance, the first user input unit 231 is configured to input commands such as START, END, SCROLL or the like, and is disposed close to one end of the display unit 251, the one end facing another end where the audio output module 260 is disposed.

The second user input unit 232 and the third user input unit 233 are configured to input commands for controlling a level of sound outputted from the audio output unit 260, or commands for converting the current mode of the display unit 251 to a touch recognition mode.

Referring to FIG. 2B, a camera 221' may be additionally provided on the rear case 202. The camera 221' faces a direction which is opposite to a direction faced by the camera 221 (refer to FIG. 2A), and may have different pixels from those of the camera 221.

For example, the camera 221 may operate with relatively lower pixels (lower resolution). Thus, the camera 221 may be useful when a user can capture his face and send it to another party during a video call or the like. On the other hand, the camera 221' may operate with a relatively higher pixels (higher resolution) such that it can be useful for a user to obtain higher quality pictures for later use. The cameras 221 and 221' may be installed at the body so as to rotate is or pop-up.

A flash 223 and a mirror 224 may be additionally disposed close to the camera 221'. The flash 223 operates in conjunction with the camera 221' when taking a picture using the camera 221'. The mirror 224 can cooperate with the camera 221' to allow a user to photograph himself in a self-portrait mode.

An audio output unit may be additionally arranged on a rear surface of the body. The audio output unit may be configured to operate as a speakerphone during a call.

Not only an antenna for calling, but also an antenna for receiving a broadcasting signal may be arranged on the side surface of the body. The antenna which constitutes part of the broadcast receiving module 111 (refer to FIG. 1) may be installed so as to be retractable from the body.

Referring to FIGS. 2A and 2B, a microphone (not shown), an interface 270, etc. may be provided at the body. The microphone is disposed close to one end of the display unit, the one end facing another end where the audio output module 260 is arranged.

A connection port 271, etc. may be disposed on side surfaces of the front case 201 and the rear case 202.

The connection port may be configured to receive data from an external device, or to receive power and to transmit the power to each component of the mobile terminal 200. Or, the connection port may be configured to transmit data inside the mobile terminal 200 to an external device. The connection portion 271 is configured as an example of the interface unit 170 (refer to FIG. 1), and may be implemented as a wired/wireless headset port, a wired/wireless data port, etc.

A power supply unit 290 for supplying power to the mobile terminal 200 is mounted to the body. The power supply unit 290 may be mounted in the body, or may be detachably mounted to the body.

Referring to FIG. 2A, the display unit 251 has a large screen. That is, the display unit 251 occupies most parts of the front surface of the terminal body. To this end, a bezel portion exposed to the front surface is formed to have a very narrow width, and the camera 221 and the display unit 251 may be very close to each other.

A discharge opening for sound output is not disposed on the front surface of the terminal body. That is, the sound output module 260 is formed in the terminal body so as to transmit sound to the front surface of the terminal body, or is formed so as not to be exposed to the outside. This structure enables a new design that a discharge opening is not formed at the display unit 251 or the bezel portion of the terminal body. The present invention provides a mechanism for implementing such structure, which will be hereinafter explained in more details.

Figure 3:
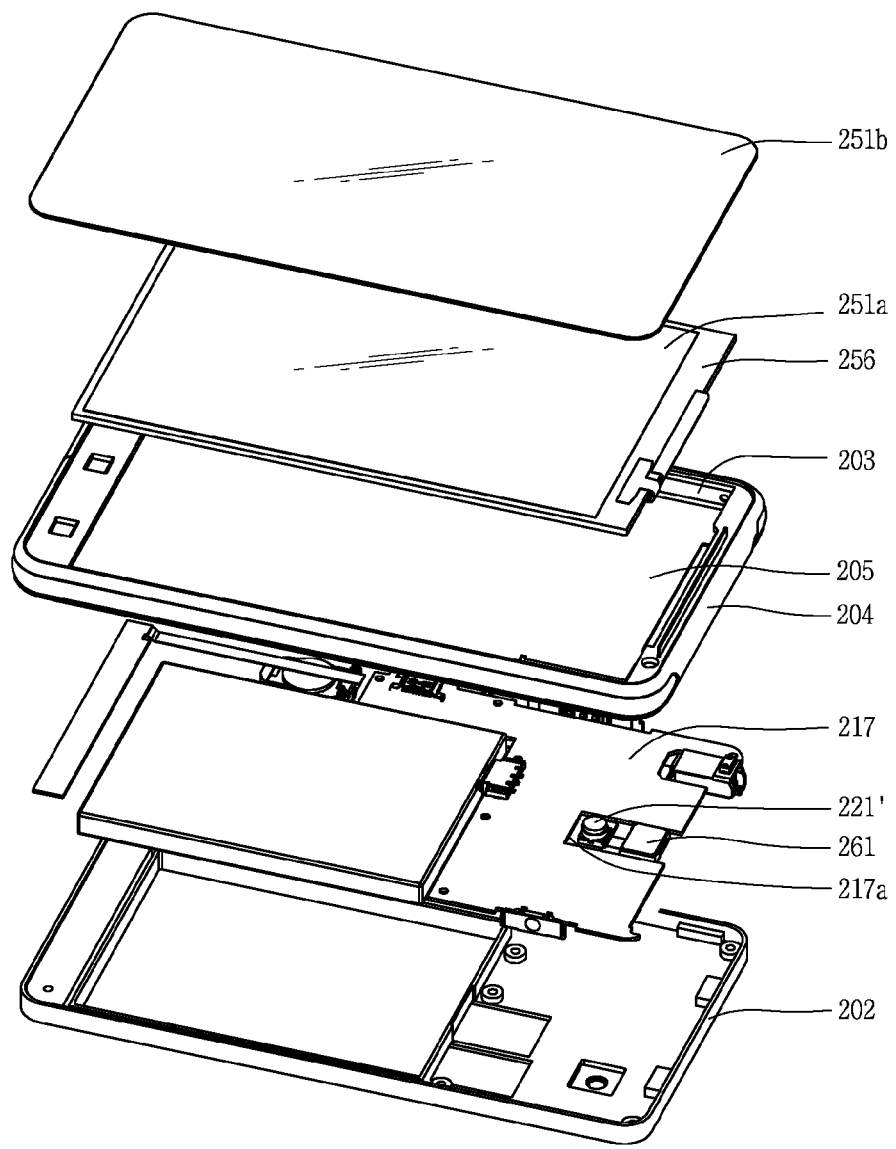
FIG. 3 is a front disassembled perspective view of the mobile terminal of FIG. 2A.
Figure 4:
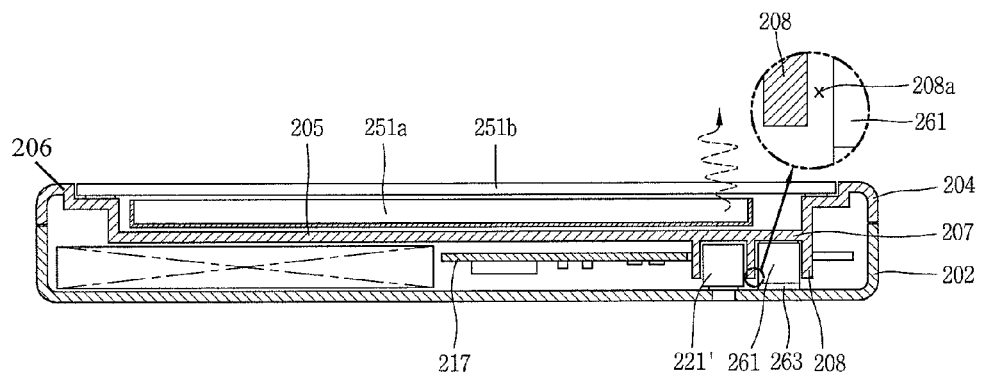
FIG. 4 is a sectional view taken along line 'IV-IV' in FIG. 2A.

FIG. 3 is a front disassembled perspective view of the mobile terminal of FIG. 2A, and FIG. 4 is a sectional view taken along line 'IV-IV' in FIG. 2A.

Referring to FIG. 3, a window 251b is coupled to one surface of the front case 201. A touch sensor (not shown) may be mounted to the window 251b. The touch sensor is configured to sense a touch input, and is formed to be transmissive. The touch sensor is mounted to a front surface of the window 251b, and is configured to convert a change of a voltage, etc. occurring from a specific part of the window 251b into an electric input signal.

As shown, the window 251b is mounted to a bezel portion 203 of the front case 201. Alternatively, the bezel portion 203 may be separately provided from the front case 201.

The window 251b is formed of light transmissive material, such as light transmissive synthetic resin or reinforcing glass. However, the window 251b may include a non-transparent region. The non-transparent region may be implemented as a pattern film covers the window. The pattern film may be formed so that a central part thereof can be transparent, and an edge part thereof can be opaque.

The pattern film is formed so that the opaque part can cover the bezel portion 203, and the transparent part can cover the display 251a. Under this structure, a user can recognize, from the outside, visual information outputted from the display 251a.

The display 251a may be disposed on the rear surface of the window 251b, and a printed circuit board 217 may be mounted to the rear case 202. The printed circuit board 217 may be configured as an example of the controller 180 (refer to FIG. 1) for performing each function of the mobile terminal. As shown, the camera 221' is connected to the printed circuit board 217, and is configured to capture external images from the rear surface of the mobile terminal. In drawings of the present invention, the aforementioned camera 221 (refer to FIG. 2A) for capturing images from the front surface of the mobile terminal is not shown. The aforementioned camera 221 may not be provided.

The display 251a may be implemented as a liquid crystal display (LCD), an organic light-emitting diode (OLED), a flexible display, a 3D display, etc. A backlight unit (not shown) is disposed on the rear surface of the display 251a, and the display 251a and the backlight unit may be supported by a display frame 256.

The window 251b, the display 251a, the display frame 256, etc. may constitute the display unit 251 (refer to FIG. 2B).

The frame 204 is formed so as to support the display unit 251 between the front surface and the rear surface of the terminal body. In this embodiment, the frame 204 is implemented as the front case 201 (refer to FIG. 2A). For instance, the frame 204 includes a part exposed to the outside of the mobile terminal, and a part inward extending from the exposed part and mounting electronic components therein. More specifically, the exposed part forms a bezel portion, and the display 251a is disposed at the mounting part. For instance, an accommodation portion 205 configured to accommodate the display 251a therein may be formed at the mounting part.

A sound output device 261 is connected to the printed circuit board 217, and is configured to transmit sound to the front surface of the mobile terminal. The sound output device 261 is configured to transmit sound using bone conduction vibrations. The sound output device 261 may be implemented as a bone conduction speaker, a bone conduction receiver, etc.

The bone conduction speaker or bone conduction receiver indicates transmitting sound in a bone conduction manner. The bone conduction speaker or bone conduction receiver includes a bone conduction transducer for converting an electric signal into a vibration signal, and uses a phenomenon that sound is directly transmitted to the internal ears via the skull without passing through the eardrums. The bone conduction can be compared with air conduction that sound in the air is transmitted to the internal ears via the external auditory canal, the eardrums and the auditory ossicles. A bone conduction transducer is attached to the bone conduction speaker or the bone conduction receiver. The bone conduction transducer serves as a vibration speaker for converting an electric signal into a vibration signal and transmitting sound.

Referring to the drawings, the sound output device 261 is connected to the frame 204 so as to transmit vibrations to the display unit 251 (refer to FIG. 2). The sound output device 261 is disposed on an opposite surface to the bottom of an accommodation portion 205, i.e., the rear surface of the frame, so as to overlap the display 251a in a thickness direction, the display 251a accommodated in the accommodation portion 205. A mounting surface 206 having a stair-step from the bottom of the accommodation portion 205 is formed at the frame 204 so that the window 251b can be mounted to cover the display 251a. Under this structure, vibrations of the sound output device 261 are transmitted to the window 251b via the frame 204, or via the frame 204 and the display 251a. As a user's head comes in contact with the window 251b during a call, the user can recognize a sound.

Referring to FIG. 4, a bonding layer is formed between the sound output device 261 and the frame. The bonding layer is implemented by an adhesive or a double-sided tape 207. For instance, the sound output device 261 is attached to the frame 204 by using the double-sided tape 207. That is, the sound output device 261 comes in plane-contact with the rear surface of the frame 204 by using the double-sided tape. Through such plane-contact, vibrations outputted from the sound output device 261 can be transmitted to the frame 204 more effectively.

A rib 208 configured to limit a movement of the sound output device 261 may protrude from the frame 204. The rib 208 is formed to enclose the outer circumference of the sound output device 261. An air gap 208a is formed between the rib 208 and the sound output device 261. That is, the rib 208 is spaced from the outer circumference of the sound output device 261 so as to non-contact the sound output device 261. However, the present invention is not limited to this. A pad may be filled in the air gap 208a.

The sound output device 261 is formed to face the rear case in a mounted state in the frame 204. And, a damping pad 263 is disposed between the sound output device 261 and the rear case 202. A designer can tune performance of the sound output device 261 using the damping pad 263. However, the present invention is not limited to this. That is, the present invention may have no damping pad.

Referring to FIG. 3, a cut-out portion 217a where the sound output device 261 is disposed is formed at one edge of the printed circuit board 217. More specifically, the cut-out portion 217a is penetratingly formed at one edge of the printed circuit board 217. A camera 221' is disposed at the cut-out portion 217a together with the sound output device 261. Under this configuration, the sound output device 261 and the camera 221' may be disposed to penetrate the printed circuit board 217. This can allow a more compact layout of the components. Furthermore, a mounting characteristic of the sound output device can be obtained. Since the sound output device 261 is disposed close to one end of the mobile terminal, vibrations generated from the sound output device 261 can be transmitted toward a user's head along a short path.

Hereinafter, other embodiments of the present invention with respect to the sound output device will be explained with reference to FIGS. 5 to 14.

FIGS. 5A to 5E are views each showing an arrangement relation between the sound output device and the camera.

Figure 5A:
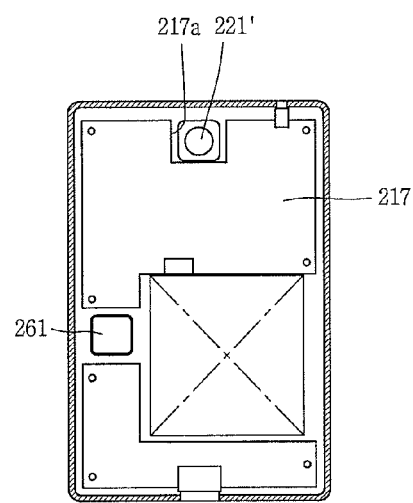
FIGS. 5A to 5E are views each showing an arrangement relation between a sound output device and a camera.

Referring to FIG. 5A, the camera 221' may be disposed at the cut-out portion 217a, and the sound output device 261 may be disposed on a position not overlapping the printed circuit board 217. Under this structure, design degrees of freedom with respect to the components layout may be increased.

Figure 5B:
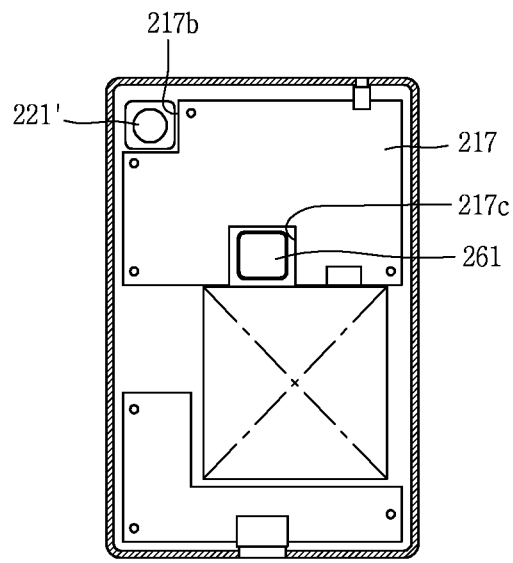

Referring to FIG. 5B, the cut-out portion 217a may include a first cut-out portion 217b and a second cut-out portion 217c. And, the camera 221' and the sound output device 261 may be disposed at the first cut-out portion 217b and the second cut-out portion 217c, respectively. Under this configuration, the mobile terminal may have a compact structure and a free layout of the components.

Figure 5C:
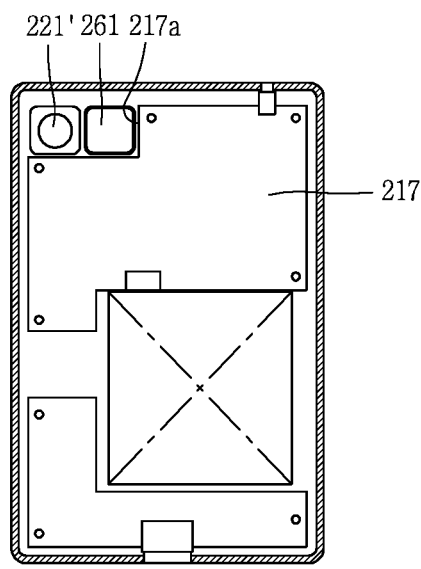
Figure 5D:
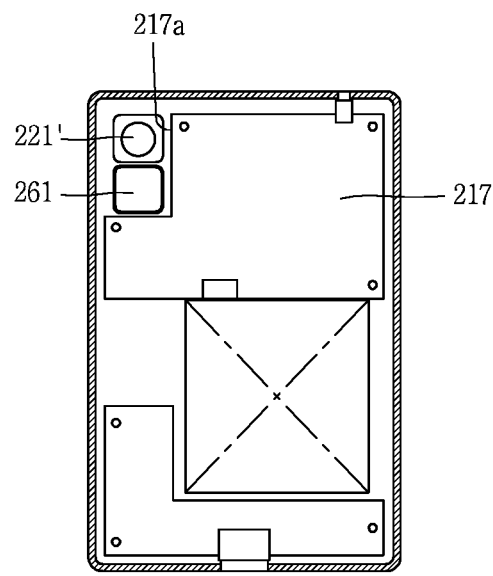
Figure 5E:
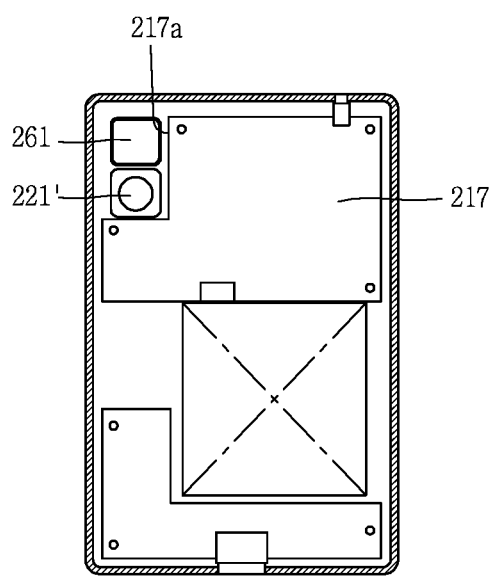

Referring to FIGS. 5C to 5E, both of the sound output device 261 and the camera 221' may be disposed in the cut-out portion 217a. And, the cut-out portion 217a may be formed at one corner of the printed circuit board 217. Under this configuration, a dead space inside the printed circuit board 217 where no circuit pattern is disposed can be reduced. Furthermore, a mounting characteristic of the sound output device 261 and performance of the mobile terminal can be enhanced.

Figure 6A:
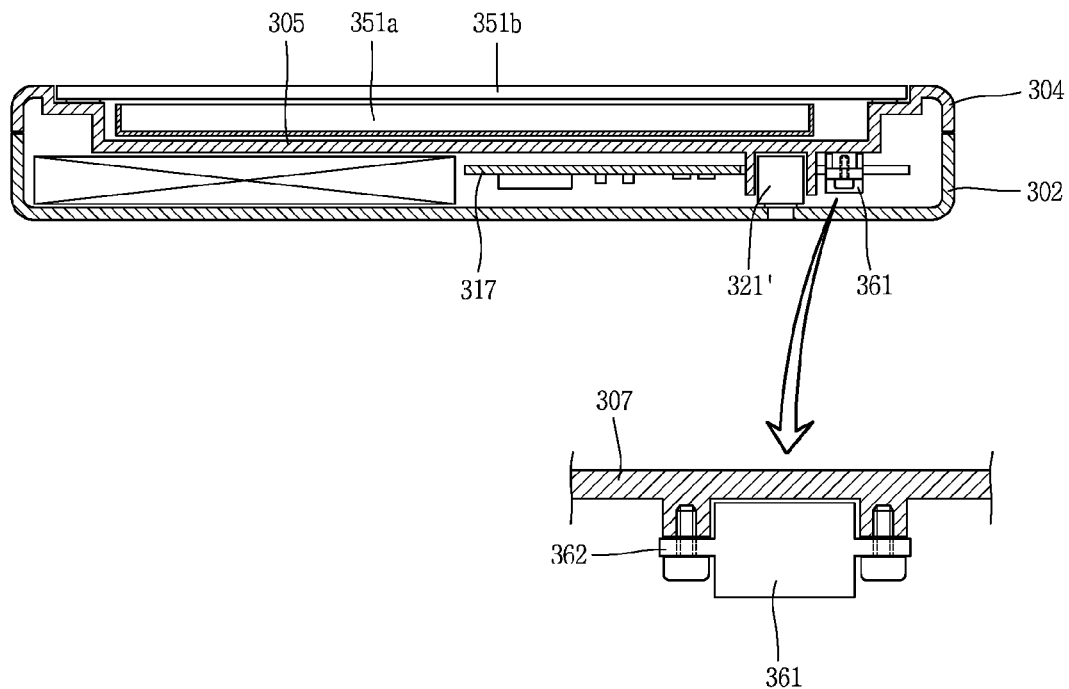
FIGS. 6A and 6B are sectional views showing modification examples of a mounting structure of a sound output device.
Figure 6B:
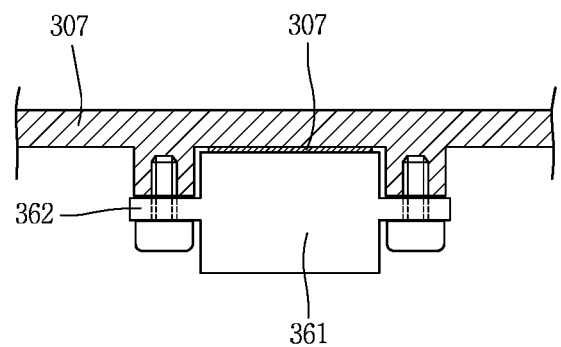

FIGS. 6A and 6B are sectional views showing modification examples of a mounting structure of the sound output device. The same or similar components as/to the aforementioned components will be provided with the same or similar reference numbers, and explanations thereof will be omitted.

Referring to FIG. 6A, assembly wings 362 protrude from an outer circumferential surface of the sound output device 361 so that the sound output device 361 can be screw-coupled to the frame 304. Through holes are formed at the assembly wings 362, and screw holes corresponding to the through holes are formed at the frame 304. As screws are coupled to the screw holes via the through holes, the sound output device 361 is coupled to the frame 304. Under this structure, vibrations of the sound output device 361 are transmitted to the front surface of the mobile terminal via the assembly wings, the screws and the frame 304. And, the vibrations of the sound output device 361 are transmitted via a contact part between the sound output device 361 and the frame 304. This can increase transmission efficiency of vibrations generated from the sound output device 361.

Referring to FIG. 6B, a double-sided tape 307 is disposed between the sound output device 361 and the frame 304 so that the sound output device 361 and the frame 304 can be adhered to each other at a contact part therebetween by the double-sided tape 307, as well as by screws. Under this structure, vibration transmission loss occurring from the contact part between the sound output device 361 and the frame 304 can be reduced.

Figure 7:
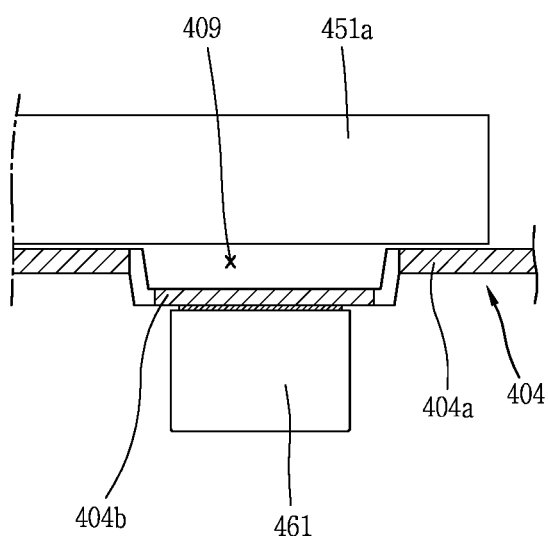
FIG. 7 is a sectional view of a mobile terminal according to another embodiment of the present invention.
Figure 8:
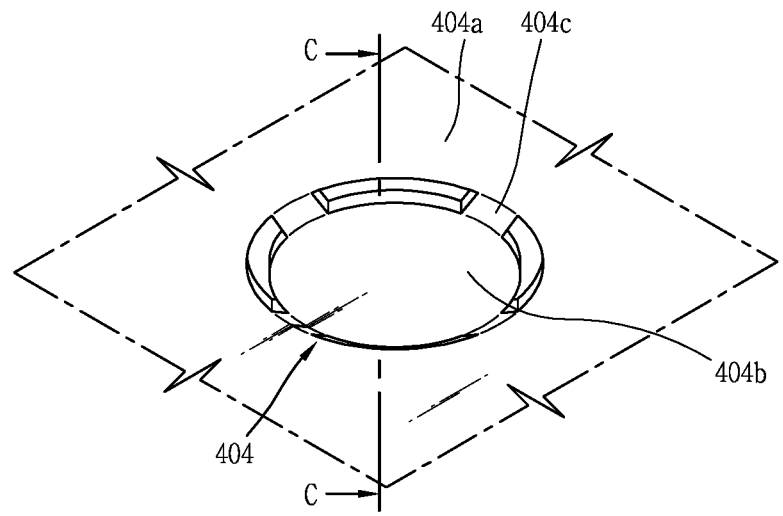
FIG. 8 is a partial perspective view of a spring structure of FIG. 7.

FIG. 7 is a sectional view of a mobile terminal according to another embodiment of the present invention, and FIG. 8 is a partial perspective view of a spring structure of FIG. 7.

Referring to FIGS. 7 and 8, a sound output device 461 is supported by a spring structure. This can allow the sound output device 461 to show a behavior similar to a free vibration behavior. For instance, the spring structure is formed at the frame 404, and the frame 404 is formed of a metallic material. More specifically, the frame 404 includes a base portion 404a, a mounting portion 404b and bridge portions 404c.

The base portion 404a constitutes at least part of the frame 404. As an example, the base portion 404a may be the bottom of an accommodation portion 405. As another example, the base portion 404a may be implemented as an additional member to be coupled to the frame 404.

The mounting portion 404b is spaced from the base portion 404a, and is configured to mount the sound output device 461 therein. For instance, the mounting portion 404b is formed in a circular shape. And, a circular through hole may be formed at the base portion 404a, and the mounting portion 404b may be disposed to overlap the through hole.

The bridge portions 404c are configured to connect the base portion 404a and the mounting portion 404b to each other. And, the bridge portions 404c may be disposed on the outer circumference of the mounting portion 404b at preset intervals. That is, the bridge portions 404c are implemented in the form of bridges at a plurality of positions, and connect the base portion 404a and the mounting portion 404b to each other. A designer can optimize performance of vibration transmission by controlling at least one of a length, a width, a thickness and a position of the bridge portions 404c.

More specifically, vibrations of the sound output device 461 are transmitted to the base portion 404c along the bridge portions 404c. This can reduce or prevent resonance of the frame by the sound output device 461. That is, performance of a low band of vibrations (sound) generated from the sound output device 461 can be enhanced.

The bridge portions 404c may protrude from the base portion 404a towards the rear surface of the terminal body. And, a space 409 is formed between the mounting portion 404b and the electronic device 451a due to the protrusion of the bridge portions 404c.

If an electronic device rather than a display (e.g., a flexible printed circuit board (FPCB), a printed circuit board and an additional mechanical structure) is mounted to an opposite side to the mounting portion 404b, the electronic device mounted to the frame 404 may be spaced from the mounting portion 404b. Furthermore, interference between the sound output device 461 and the electronic device disposed on an opposite side to the mounting portion 404b may be prevented due to the space.

Figure 9:
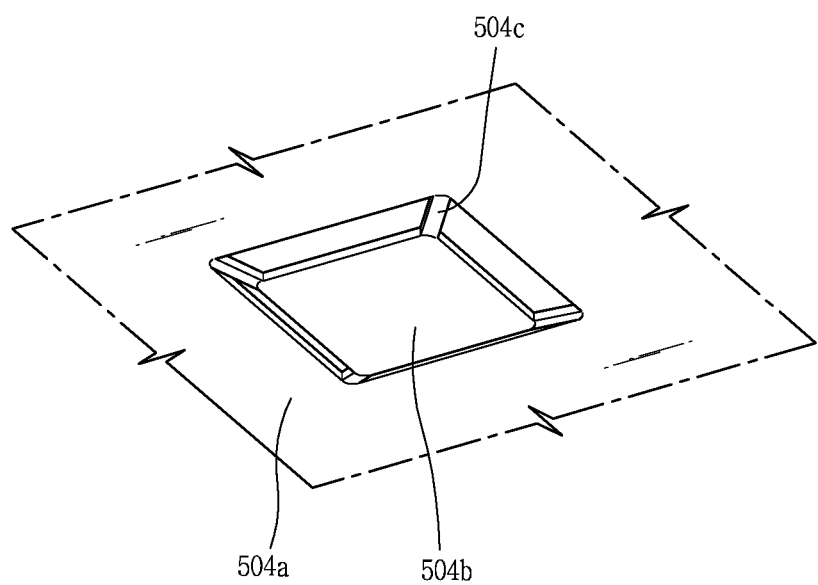
FIG. 9 is a partial perspective view showing a modification example of bridge portions and a mounting portion of FIG. 8.
Figure 10A:
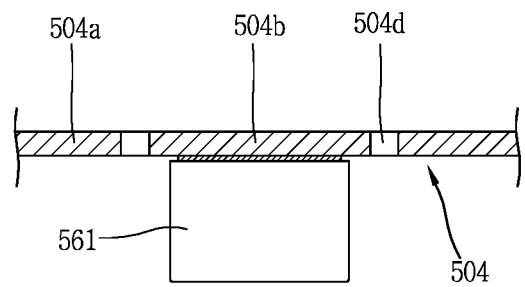
FIGS. 10A and 10B are a sectional view and a conceptual view of a mobile terminal, respectively, according to still another embodiment of the present invention.
Figure 10B:
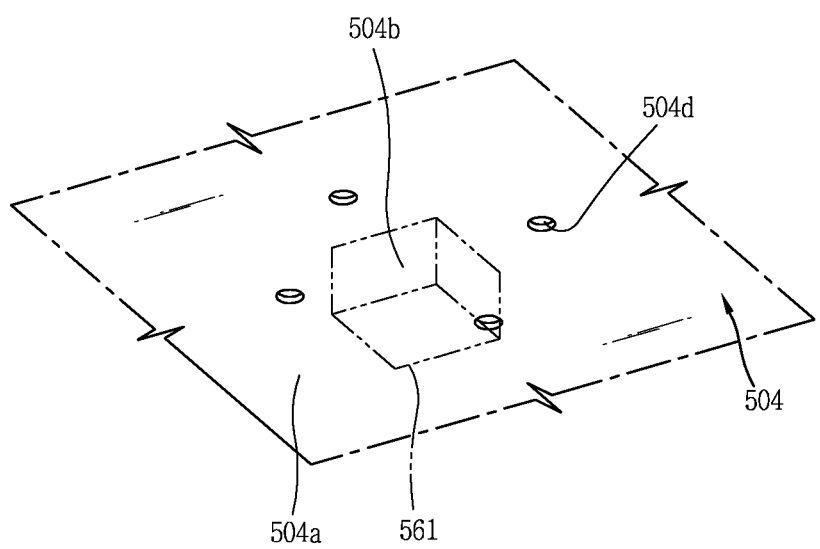

FIG. 9 is a partial perspective view showing a modification example of bridge portions and a mounting portion of FIG. 8, and FIGS. 10A and 10B are a sectional view and a conceptual view of a mobile terminal, respectively, according to still another embodiment of the present invention.

Referring to FIG. 9, a mounting portion 504b may have a quadrangular shape. The bridge portions 404c extend to a base portion 504a from each corner of the quadrangle. As a result, a slit is formed at each edge of the quadrangle. A designer can optimize performance of vibration transmission by controlling a shape of the spring structure.

Referring to FIGS. 10A and 10B, through holes 504d or slits are formed at a frame 504 at preset intervals along the outer circumference of a sound output device 561.

In this case, the mounting portion 504b is disposed on the same plane as the base portion 504a. Vibration transmission does not occur between the base portion 504a and the mounting portion 504b by the through holes 504d. Under this configuration, a vibration transmission behavior of the sound output device 561 can be controlled.

FIGS. 11 to 14 are sectional views of a mobile terminal according to still another embodiment of the present invention.

Figure 11:
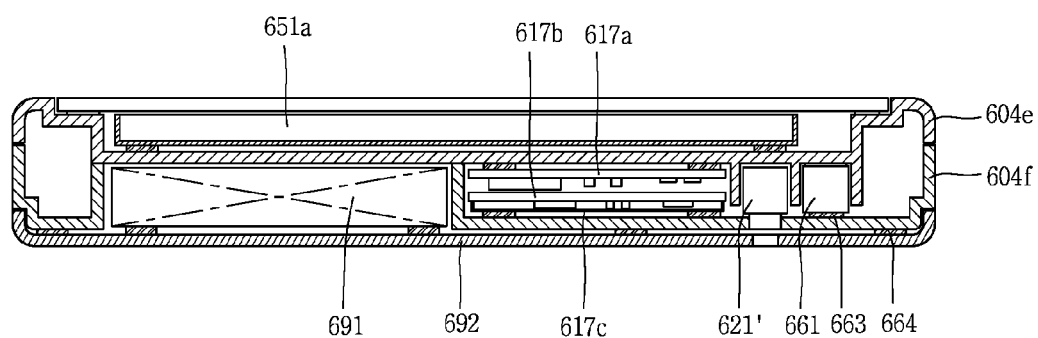
FIGS. 11 to 14 are sectional views of a mobile terminal according to still another embodiment of the present invention.

Referring to FIG. 11, a frame is provided with a first frame 604e and a second frame 604f. And, a sound output device 661 is mounted to the first frame 604e, and is covered by the second frame 604f. In this case, the first frame 604e may be a front case of the mobile terminal, and the second frame 604f may be a rear case of the mobile terminal. A battery accommodation portion for accommodating a battery 691 is formed at the second frame 604f, and the bottom of the battery accommodation portion is implemented by a rear surface of the first frame 604e. A battery cover 692 is detachably mounted to the second frame 604f so as to cover the battery 691. Printed circuit boards 617a and 617b may be disposed at a space defined by the first and second frames. A shield can 617c may be mounted to one of the printed circuit boards 617a and 617b.

As shown, one or more damping pads may be mounted to at least a position between a display 651a and the first frame 604e, between the battery 691 and the first frame 604e, between the printed circuit board 617a and the first frame 604e, and between the shield can 617c and the second frame 604f. However, the present invention is not limited to this. That is, only some of the damping pads may be implemented, which enables resonance controls.

A first damping pad 663 is disposed between the second frame 604f and the sound output device 661. A designer can directly tune performance of the sound output device 661 using the first damping pad 663.

A second damping pad 664 for damping vibrations of the sound output device 661 may be mounted between the battery cover 692 and the second frame 604f. And, a damping pad may be disposed between the battery 691 and the battery cover 692.

Figure 12:
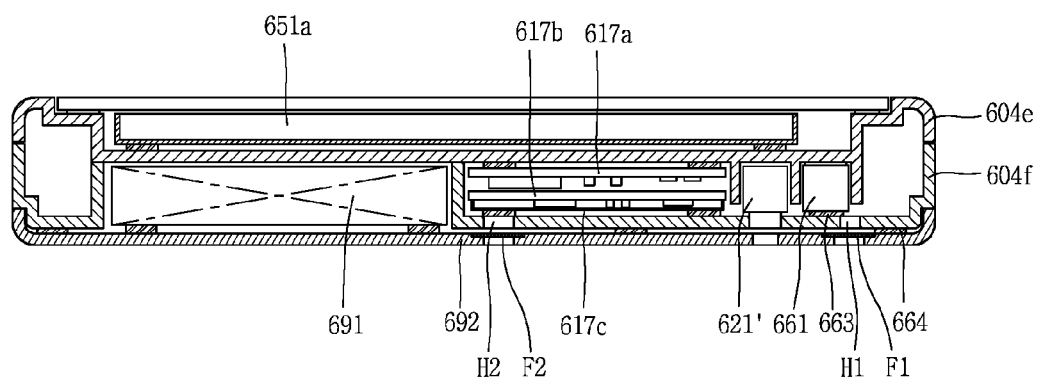

Referring to FIG. 12, discharge holes H1, H2 through which peripheral air of the sound output device 661 is discharged may be formed at the second frame 604f. The discharge hole H1 may be formed at the second frame 604f so as to face the sound output device 661. Under this structure, a resonance phenomenon occurring from a rear surface of the sound output device 661 may be reduced or prevented. The discharge hole may be formed in one, but may be formed in plurality as shown. In order to reduce a resonance phenomenon occurring from a space defined by the first frame 604e and the second frame 604f, the space where the printed circuit boards 617a and 617b are arranged, another discharge hole H2 may be formed at the second frame 604f in correspondence to the space. Through holes corresponding to the discharge holes H1 and H2 may be formed at the battery cover. Filters F1 and F2 configured to prevent introduction of foreign materials may be mounted to the discharge holes.

Figure 13:
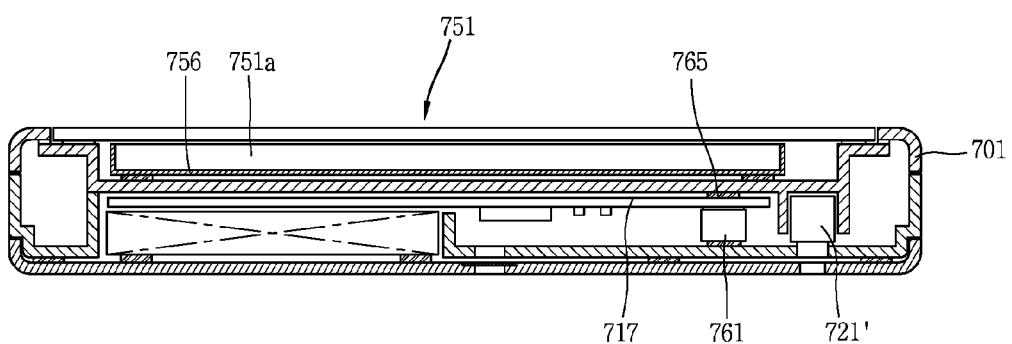

Referring to FIG. 13, a sound output device 761 may be connected to a frame 704 via a printed circuit board 717. In this case, the frame 704 may be separately provided from a front case 701. The front case 701 is configured as a front surface of the mobile terminal. However, the present invention is not limited to this. For instance, the front case 701 may be configured as side cases which form side surfaces of the mobile terminal.

As shown, the printed circuit board 717 is implemented as a single board, and is mounted to a rear surface of the frame 704. The sound output device 761 is mounted to the printed circuit board 717, and a performance tuning pad 765 is mounted between the printed circuit board 717 and the frame 704. The performance tuning pad 765 may be disposed at the printed circuit board 717 on an overlapping position with the sound output device 761. A damping pad may be additionally disposed between the sound output device 761 and another frame.

Figure 14:
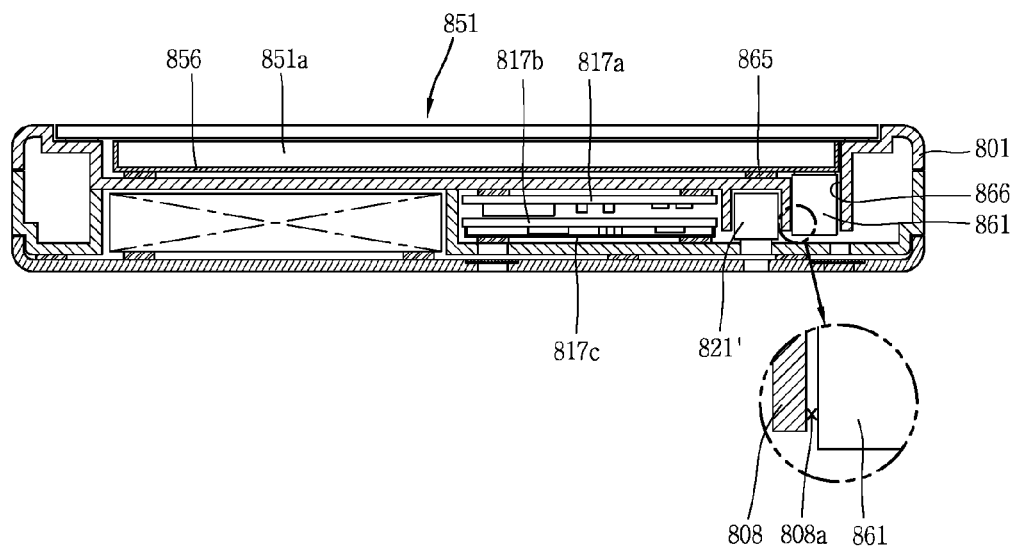

Referring to FIG. 14, a sound output device 861 may be connected to a frame 804 via a display unit 851. The display unit 851 includes a display 851a and window 851b. In this case, the display 851a may be a hybrid type attached to the window 851b. A touch sensor may be disposed between the window 851b and the display 851a.

For instance, a through hole 866 is formed at the frame 804 on a position covered by the display 851a, and the sound output device 861 is disposed at the through hole 866. The sound output device 861 is mounted to a rear surface of the display 851a via the through hole 866, more specifically, a rear surface of a display frame 856. The sound output device 861 is mounted to the display frame 856 by using a double-sided tape 807, etc., and regions of the sound output device 861 rather than a contact part with the display frame 856 are enclosed by an air gap.

Under such structures that the display 851a is mounted to the window 851b, and the sound output device 861 is directly attached to the display frame 856, a vibration transmission path is shortened. This can allow vibration transmission loss to be reduced.

The mobile terminal according to the present invention may have the following advantages.

Firstly, the bone conduction sound output device is mounted to the frame for supporting the display unit. Accordingly, the sound output device can be easily mounted to the mobile terminal, and vibrations can be more effectively transmitted to the front surface of the mobile terminal.

Secondly, performance of the sound output device can be controlled in an independent manner from the frame due to the bridge portions. Furthermore, the sound output device shows a behavior similar to a free vibration behavior.

Thirdly, air which resonates around the sound output device can be discharged out via the discharge hole. This can minimize a resonance phenomenon.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a body having a front surface and a rear surface;
   a display unit formed on the front surface of the body;
   a frame disposed between the front surface and the rear surface, and configured to support the display unit; and
   a sound output device configured to transmit sound using bone conductive vibration, and connected to the frame so as to transmit the vibration to the display unit,
   wherein the sound output device is attached to the frame by using a double-sided tape, and
   wherein the frame includes:
      a base portion which forms at least part of the frame;
      a mounting portion spaced from the base portion, and configured to mount the sound output device thereon; and
      bridge portions configured to connect the base portion and the mounting portion to each other.

2. The mobile terminal of claim 1, wherein the display unit includes:
   a window disposed on the front surface of the body; and
   a display accommodated in the frame so as to face the window, and overlapping the sound output device in a thickness direction of the body.

3. The mobile terminal of claim 2, wherein the frame has an accommodation portion for accommodating the display unit, and the sound output device is mounted on an opposite surface to the bottom of the accommodation portion.

4. The mobile terminal of claim 3, wherein a mounting surface having a stair-step from the bottom of the accommodation portion is formed at the frame such that the window is mounted to cover the display unit.

5. The mobile terminal of claim 1, wherein a rib configured to limit a movement of the sound output device protrudes from the frame.

6. The mobile terminal of claim 5, wherein an air gap is formed between the rib and the sound output device.

7. The mobile terminal of claim 1, wherein assembly wings protrude from an outer circumferential surface of the sound output device such that the sound output device is screw-coupled to the frame by the assembly wings, as well as by the double-sided tape.

8. The mobile terminal of claim 1, wherein the bridge portions protrude from the base portion toward a rear surface of the body.

9. The mobile terminal of claim 8, wherein an electronic device is mounted to the frame, and a space is formed between the mounting portion and the electronic device due to the protrusion of the bridge portions.

10. The mobile terminal of claim 1, wherein the bridge portions are disposed on the outer circumference of the mounting portion at preset intervals.

11. The mobile terminal of claim 1, wherein vibrations of the sound output device are transmitted to the base portion along the bridge portions.

12. The mobile terminal of claim 1, wherein through holes or slits are formed at the frame at preset intervals along the outer circumference of the sound output device.

13. The mobile terminal of claim 1, wherein the frame includes a first frame and a second frame,
wherein the sound output device is mounted to the first frame, and is covered by the second frame, and
wherein a first damping pad is mounted between the second frame and the sound output device.

14. The mobile terminal of claim 13, wherein a discharge hole through which peripheral air of the sound output device is formed at the second frame.

15. The mobile terminal of claim 13, wherein a battery is mounted in the body, and a battery cover for covering the battery is detachably coupled to the second frame.

16. The mobile terminal of claim 15, wherein a second damping pad configured to damp vibrations of the sound output device is disposed between the second frame and the battery cover.

17. The mobile terminal of claim 1, wherein the sound output device is connected to the frame via a printed circuit board or the display unit.

18. The mobile terminal of claim 1, wherein the sound output device is electrically connected to a printed circuit board, and a cut-out portion where the sound output device is disposed is formed on one edge of the printed circuit board.

19. The mobile terminal of claim 18, wherein a camera is disposed at the cut-out portion together with the sound output device.

* * * * *